United States Patent [19]
Woolf et al.

[11] Patent Number: 5,993,884
[45] Date of Patent: *Nov. 30, 1999

[54] USE OF POLYVINYLPYRROLIDONE IN FAT REDUCED DAIRY PRODUCTS

[75] Inventors: Herb D. Woolf, Easton, Pa.; Roger C. Hollenbach, Kendall Park, N.J.; Robert T. Marshall, Columbia, Mo.

[73] Assignee: BASF Corporation, Mount Olive, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/866,438

[22] Filed: May 30, 1997

Related U.S. Application Data

[60] Provisional application No. 06/018,891, May 31, 1996.

[51] Int. Cl.⁶ .................................................... A23C 23/00
[52] U.S. Cl. ......................... 426/580; 426/804; 426/582; 426/583; 426/565
[58] Field of Search ................................... 426/804, 611, 426/582, 583, 565, 580

[56] References Cited

U.S. PATENT DOCUMENTS

| | | |
|---|---|---|
| 3,998,974 | 12/1976 | Zaffaroni . |
| 4,022,882 | 5/1977 | Ely . |
| 4,031,261 | 6/1977 | Durst . |
| 4,217,369 | 8/1980 | Durst . |
| 4,714,620 | 12/1987 | Bunick et al. . |
| 4,789,664 | 12/1988 | Seligson et al. . |
| 4,917,908 | 4/1990 | Prosise . |
| 4,937,086 | 6/1990 | Prosise . |
| 4,985,261 | 1/1991 | Kang et al. . |
| 4,985,270 | 1/1991 | Singer et al. . |
| 5,059,432 | 10/1991 | Berkowitz et al. . |
| 5,091,200 | 2/1992 | Kang et al. . |
| 5,194,281 | 3/1993 | Johnston et al. . |
| 5,217,736 | 6/1993 | Feeney et al. . |
| 5,356,644 | 10/1994 | Hendrick et al. . |
| 5,368,869 | 11/1994 | Savello et al. . |
| 5,393,544 | 2/1995 | Hannah et al. . |
| 5,624,612 | 4/1997 | Sewall ...................................... 264/4.1 |
| 5,718,969 | 2/1998 | Sewall ...................................... 426/573 |

FOREIGN PATENT DOCUMENTS

| | | |
|---|---|---|
| 350419 | 1/1990 | European Pat. Off. . |
| WO 90/00008 | 1/1990 | WIPO . |
| WO 91/00025 | 1/1991 | WIPO . |

OTHER PUBLICATIONS

BASF, Soluble Kollidon®, Jun. 1993.
BASF, Kollidon® CL, Kollidon, CL–M, Crospovidone M, Nov. 1993.
Martin Glicksman, "Comparative Properties of Hydrocolloids", *Food Hydrocolloids*, vol. 1, Chapter 1, (Sep., 1980) pp. 1–18.
Martin Glicksman, "Functional Properties of Hydrocolloids", *Food Hydrocolloids*, vol. 1, Chapter 3, (Sep., 1980) pp. 47–99.
Martin Glicksman, "Synthetic Hydrocolloids", Gum Technology in the Food Industry, *Food Science and Technology*, Chapter 13, (1969) pp. 472–484.

*Primary Examiner*—Carolyn Paden
*Attorney, Agent, or Firm*—George A. Gilbert

[57] ABSTRACT

Food compositions and methods are provided for non-fat and low-fat food compositions containing a polyvinylpyrrolidone. The food compositions contain polyvinylpyrrolidone and other ingredients such as food stabilizers. Preferred compositions are non-fried foods, which include diary products, baked goods, salad dressings, and meat products. Specific food compositions include ice cream, muffins and pourable salads.

21 Claims, 2 Drawing Sheets

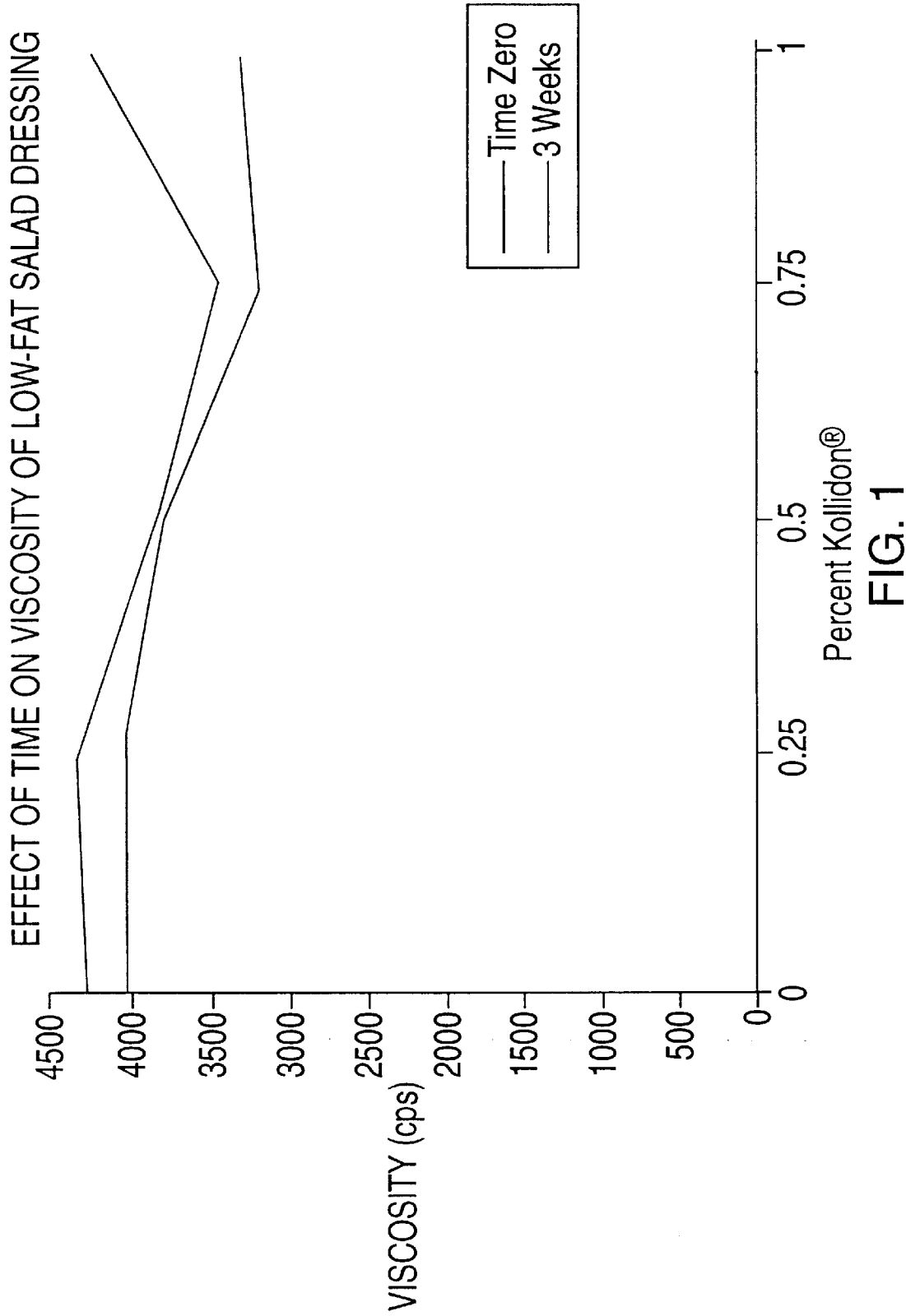

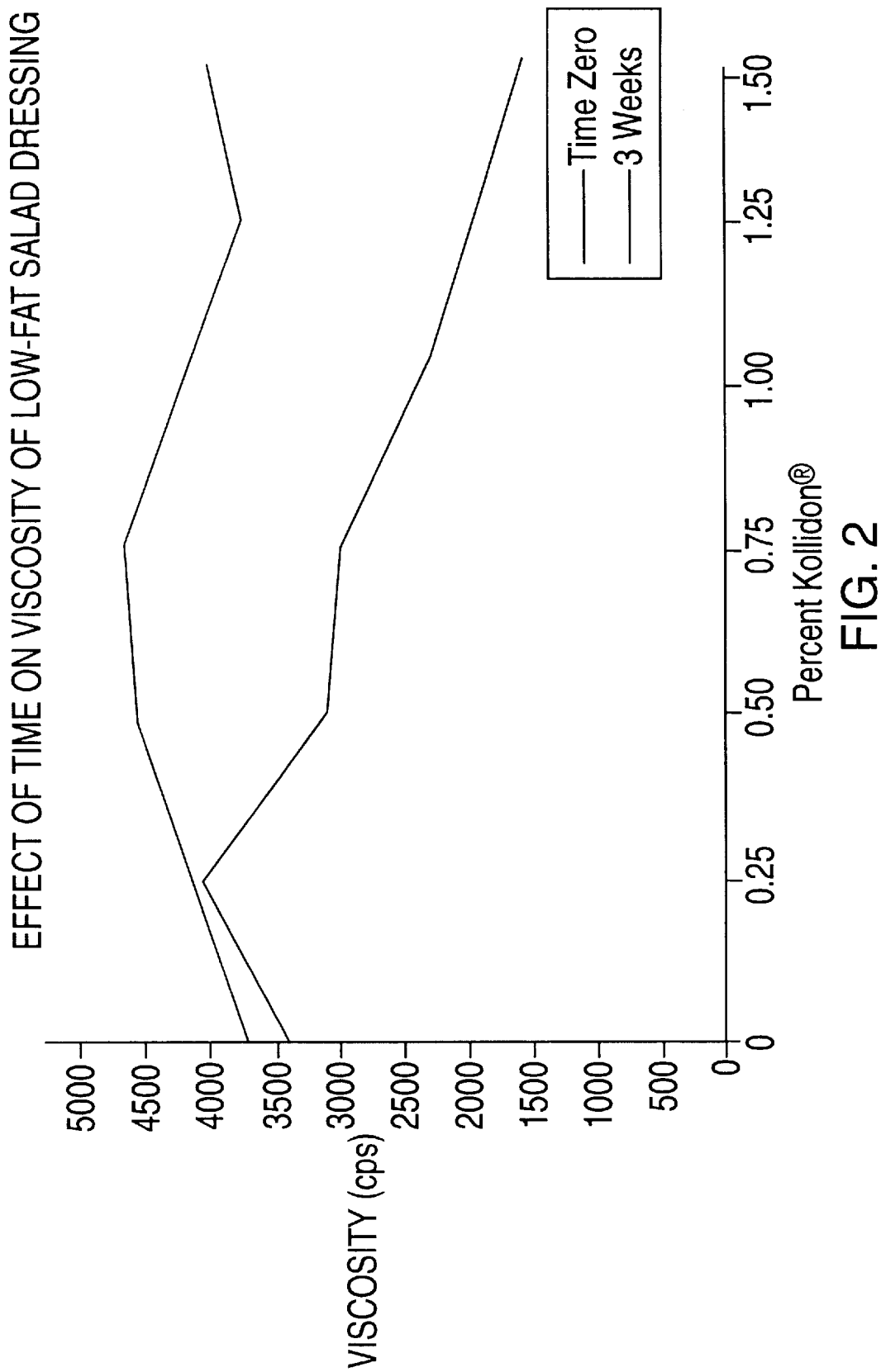

USE OF POLYVINYLPYRROLIDONE IN FAT REDUCED DAIRY PRODUCTS

This application claims the benefit of U.S. Provisional Application No. 06/018,891 filed on May 31, 1996.

FIELD OF THE INVENTION

The present invention relates generally to the use of polyvinylpyrrolidone in food compositions and more specifically to the use of polyvinylpyrrolidones in low fat and non-fat food compositions such as in non-fried goods comprising dairy products, baked goods, salad dressings and meat products.

BACKGROUND OF THE INVENTION

The consumption of excessive amounts of vegetable oils and animal fats has been linked to health problems such as obesity, heart disease and even cancer. It has been estimated that approximately 40% of the caloric intake of most Americans is derived from fat. Physicians and nutritionists are urging Americans to reduce their fat intake to 30% or less of their caloric intake. In fact, one well known cardiologist is advocating a 10% fat diet and has provided evidence that heart disease can be reversed through use of a 10% fat diet. Nevertheless, Americans have found it difficult to reduce their fat intake because foods that contain fat have pleasing organoleptic attributes.

Health and vanity concerns have generated a great deal of interest in the development of fat substitutes that can replace animal and vegetable fats in food while retaining the desirable organoleptic properties of fat containing foodstuffs. Fat substitutes useful as an ingredient in food are known. For example, U.S. Pat. No. 5,194,281 to Johnston, et al., , discloses polyol fatty acid polyesters as fat substitutes in baked, fried and dairy foods. U.S. Pat. No. 4,985,270 to Singer et al., discloses non-fat and reduced fat dairy products, wherein the fat is replaced by a proteinaceous macrocolloid comprising denatured protein particles. U.S. Pat. No. 5,356,644 to Hendrick et al., discloses a low calorie fat substitute comprising a coating of digestible solid or semi-solid fat surrounding a low or non-caloric core material. The core material is microcrystalline cellulose, polydextrose, or non-fibrous cellulose derivatives.

The use of polyvinylpyrrolidone (PVP) in foods has also been investigated. U.S. Pat. No. 4,937,086 to Prosise discloses the use of polyvinylpyrrolidone in fried donuts to prevent the uptake of fat during frying resulting in a donut with reduced fat. The donut mix may contain 0.1–10% by weight polyvinylpyrrolidone. U.S. Pat. No. 4,917,908 to Prosise discloses the use of polyvinylpyrrolidone as a french fry coating wherein said french fry is rendered resistant to oil absorption. Polyvinylpyrrolidone has also been used as a film former to prepare fat containing shakes suitable for freezing and reconstitution and as a controller molecule to regulate the absorption of a flavoring component. See U.S. Pat. No. 4,031,261 to Durst and U.S. Pat. No. 3,998,974 to Zaffaroni, respectively.

Polyvinylpyrrolidone is known as a direct food additive in such applications as: 1) a tablet adjuvant for flavor concentrates; 2) a stabilizer, bodying agent and dispsersant in non-nutritive sweeteners in concentrated liquid form; 3) an adjuvant in non-nutritive sweeteners in tablet form; 4) a stabilizer, bodying agent and dispersant in vitamins and mineral concentrates in liquid form; 5) a tableting adjuvant in vitamin and mineral concentrates in tablet form; and 6) a clarifying agent in vinegar, wine and beer.

A detailed description of polyvinylpyrrolidone is provided in Kollidon® polyvinylpyrrolidone for the Pharmaceutical Industry, BASF Akteingesellschaft, Feinchemie, D-67056 (1993) and incorporated herein by reference. The soluble grades of polyvinylpyrrolidone are obtained by free-radical polymerization of vinylpyrrolidone in water or isopropanol, yielding the chain structure of polyvinylpyrrolidone. The insoluble grades of polyvinylpyrrolidone are obtained by popcorn polymerization of N-vinylpyrrolidone which yields a crosslinked polymer.

Although polyvinylpyrrolidone has been used in specific food for various purposes, the inventors have surprisingly discovered that the addition of polyvinylpyrrolidone to replace the fat in foods, produces a fat free or reduced fat food stuff that is healthier as well as pleasing to the palate.

Thus it is an object of the present invention to provide a product that is not only low in fat content but also one that has pleasing organoleptic attributes.

BRIEF DESCRIPTION OF THE DRAWINGS

FIG. 1 is a graph of the effect of time on the viscosity of a low-fat pourable salad dressing.

FIG. 2 is a graph of the effect of time on the viscosity of a non-fat pourable salad dressing.

SUMMARY OF THE INVENTION

Provided herein is a food composition comprising a polyvinylpyrrolidone wherein the composition is provided in the substantial absence of fat. Preferred compositions are those that are low-fat or non-fat formulated foods, including those foods formulated with multiple components.

Further provided is a method of preparing a reduced fat food composition comprising substituting at least a portion of the fat in a food composition with a polyvinylpyrrolidone.

Also provided herein is a method of preparing a low fat or non-fat food composition comprising adding polyvinylpyrrolidone to a food composition wherein the food composition is provided in the substantial absence of fat.

Surprisingly, the composition provides similar organoleptic attributes as the same product with fat. Accordingly, embodiments of the invention include the addition of a polyvinylpyrrolidone to a food composition in an amount effective to improve at least one organoleptic attribute, preferably at least two attributes.

Specific embodiments of the invention include non-fried food products such as those food compositions selected from the group consisting of dairy foods, baked foods, salad dressings, and meat products.

Preferred embodiments of the invention have a polyvinylpyrrolidone in an amount up to about 0.25%, most preferably up to about 0.1%. Other embodiments of the invention have a polyvinylpyrrolidone content of about 0.1% to about 1.25%, from about 0.25% to about 1.25% and from 0.1% to about 0.25%.

DETAILED DESCRIPTION OF THE INVENTION

In one aspect of the invention, the inventors have discovered that dairy foods, such as ice cream, made without fat or low in fat and with a polyvinylpyrrolidone have at least two mouthfeel attributes as an equivalent dairy food composition containing fat. In a preferred embodiment of the invention, the dairy food is selected from the group consisting of ice cream, cheese, milk and yogurt.

In a preferred aspect of the invention, polyvinylpyrrolidone is added to an ice cream composition wherein said composition is substantially free of fat such as in non-fat or fat-free compositions. The preferred composition has at least two mouthfeel attributes as a standard ice cream composition comprising about 10–12% fat. Preferably the polyvinylpyrrolidone is provided in an amount of about 0.2% up to less than about 1.6% (weight percent—of the total weight of the composition), 0.2% up to less than about 1.6% (weight percent—of the total weight of the composition), more preferably in the amount weight of from about 0.25% to about 1.0%, and most preferably at about 1.0%.

Dairy products are typically defined as products which are composed in part or whole from milk; the normal secretory fluid of the mammary glands, typically from bovines.

Fatted ice cream is typically defined as a frozen dairy product containing 10.0 to 20.0 milk fat, 5 to 11% Milk Solids Not-Fat (MSNF), sugar 13 to 17%, stabilizers (0.0 to 0.40%), and total solids 35.0 to 45%.

Embodiments of the invention may also be used in a variety of frozen dairy dessert which includes low-fat ice cream, nonfat frozen desserts (maximum of 0.5% milk fat), dietetic frozen dessert (milk fat not less than 2.0%), frozen dietary food (milk fat 1.0% to 8.0%), puddings, and ice milk.

In another aspect of the invention, a baked food composition is provided comprising a polyvinylpyrrolidone wherein said food composition is provided in the substantial absence of fat. Preferably the baked good composition is selected from the group consisting of compositions used to make breads, cakes, muffins, pies, cookies and biscuits.

Baked food compositions are typically defined as foods, such as bread, rolls or buns, produced by baking mixed yeast-leavened dough prepared from one or more acceptable farinaceous ingredients, and typically comprising water, yeast, salt, shortening. Muffins are generally defined as a small cupped shaped bread usually sweetened.

In one aspect of the invention, a muffin composition is prepared wherein the composition contains up to about 1.25%, by total weight of the composition, polyvinylpyrrolidone, preferably Kollidon® 90F. In a more preferred embodiment of the muffin composition, the polyvinylpyrrolidone is provided in an amount up to about 0.25%, most preferably up to about 0.1%. Other embodiments of the invention include muffins and other baked goods having a polyvinylpyrrolidone, by weight, of about 0.1% to about 1.25%, from about 0.25% to abut 1.25% and from 0.1% to about 0.25%. Fat-free muffin compositions are preferred over low-fat muffins.

In a further aspect of the invention, a low fat or non-fat salad dressing is provided comprising a polyvinylpyrrolidone, preferably in combination with a food stabilizer, wherein the salad dressing is provided in the substantial absence of fat. Preferred food stabilizers include Avicel® microcrystalline cellulose (FMC Corporation) and xanthan gum. Also provided herein is a method of preparing a salad dressing composition wherein said method comprises substituting fat with a polyvinylpyrrolidone and a stabilizer.

Preferred low-fat and fat-free dressing systems comprise up to 1.5% polyvinylpyrrolidone, preferably from about 0.25% up to about 1.5%, more preferably from 0.25% to about 1.0% or 1.25%. The preferred amount of polyvinylpyrrolidone for improving mouthfeel, flavor release and balance is about 1.0%.

Preferred polyvinylpyrrolidones useful in the practice of the present invention are available in three grades: Kollidon® 25 (BASF Corporation), Kollidon® 90 (BASF Corporation), and Kollidon® Cl-M (BASF Corporation). Kollidon® 25 has a weight average molecular weight of 28000–34000. Kollidon® 90 has a molecular weight average of 1000000–1500000.

While not wishing to be bound to any theory, it is believed that the surprising and unexpected organoleptic attributes provided by the present invention are related to the fact that a polyvinylpyrrolidone is a high molecular weight polymer. Because polyvinylpyrrolidone has a high propensity to absorb water during its hydration and, because of its polymer structure, it is able to create a highly viscous solution at relatively low levels of incorporation. These properties are compatible with low fat formulated foods because the fat phase is minimized or eliminated yet the foods retain a beneficial viscosity. The viscous phase produced by the addition of the polyvinylpyrrolidone may simulate the viscosity of the fat which it replaces therefore providing the beneficial viscosity that accounts for the textural and mouth-coating effects observed. It is believed that the polyvinylpyrrolidone, by absorbing water, in a long polymeric structure, retards the creation of water crystals at freezing temperatures. Accordingly, water soluble components which impart flavor can be reduced in intensity in more viscous formulations because of its hydration with polyvinylpyrrolidone.

The following examples are illustrative only and are not meant to limit the invention in any manner.

EXAMPLE 1

Ice cream samples containing a polyvinylpyrrolidone were prepared as follows (as above, all percentages of polyvinylpyrrolidone described hereinafter are based on the weight percent of 100% of the total weight of the compositions):

|  | Control | 0.8% PVP | 1.6% PVP |
| --- | --- | --- | --- |
| Sugar | 12% | 11.9% | 11.8% |
| 36 DE Corn Syrup Solids | 3% | 2.98% | 2.95% |
| 15 DE maltodextrin | 3% | 2.98% | 2.95% |
| Simplesse ® fat substitute (The Simplesse Company) | 5% | 4.96% | 4.92% |
| Nonfat milk solids | 13.5% | 13.39% | 13.38% |
| Dry Buttermilk | 1% | 0.99% | 0.98% |
| Water | 62.5% | 62.0% | 61.5% |

Standard fatted ice-cream (10–12%) was also used as a positive control.

The ice cream samples were evaluated by a 9-member sensory panel for mouthfeel, aroma and appearance. For the appearance evaluation the panel was asked to evaluate the sample for fluffiness, adhesiveness and smoothness. For fluffiness, the panel was asked to evaluate, before moving the sample, fluffiness: Non-continuous surface including jagged edges, may or may not be of ice origin. The panel was also asked to push the ice cream with the back of a spoon and evaluate adhesiveness: the degree to which the sample sticks to the spoon. Finally the panel was asked to evaluate smoothness: the degree to which the "background" ice cream appears smooth or homogeneous.

For aroma, the panel was asked to hold the container close to their nose and sniff and evaluate the intensity of vanilla, milk powder, cooked milk and whey.

The panel was also asked to evaluate mouthfeel by first taking a full teaspoon of ice cream into their mouth and bite with their molars and evaluate gumminess: the degree to which the ice cream has elastic qualities.

The panel was then asked to allow the ice cream to melt and rate the melting rate: the measurement of the speed at which the ice cream melts or dissolves. The panel was then asked to move the ice cream around in their mouth with their tongue and to evaluate thickness: the thickness of the sample from thin to thick, after the sample has melted.

The panelists were further instructed to take another teaspoon of ice cream into their mouth and push their tongue against the roof of the mouth and evaluate: 1) smoothness: the degree to which the "background" ice cream feels smooth or homogeneous; 2) coarseness: the degree to which the ice cream include particles which may or may not be ice crystals; and 3) mouthcoating: the degree to which the ice cream coats the mouth before expectoration.

Finally, the panelists were asked to expectorate the sample and rate: 1) mouthcoating: the degree to which the ice cream remains in the mouth after expectoration and 2) astringency: the intensity of astringency or mouthdrying.

The following results were obtained:

1. Aroma of vanilla: Kollidon® 90F did not differ from the control but had more aroma than the Kollidon® 25 or Kollidon® CL-M;
2. Vanilla flavor: Kollidon® 90F had a lower intensity than the control but was not different from Kollidon® 25 or Kollidon® CL-M;
3. Cooked milk aroma: Kollidon® 90F did not differ from the control but had more aroma than the Kollidon® 25;
4. Fluffiness: Kollidon® 90 F was far less fluffy than the control and the Kollidon® 25 but did not differ from the Kollidon® 90 CL-M;
5. Adhesiveness (stick to spoon): Kollidon® 90F was far more adhesive than the other three samples which did not differ among themselves;
6. Smoothness: Kollidon® 90F was more smooth than the other three samples which did not differ among themselves;
7. Off Flavor: Kollidon® 90 F was very low in off flavor and comparable to the control. Both Kollidon® 25 and Kollidon® CL-M had significantly more off-flavor than the control;
8. Gumminess and thickness: Results were parallel for these two characteristics with Kollidon® 90F being far higher than Kollidon® 25 or Kollidon® CL-M. They, in turn, were higher than the control;
9. Melting rate: Kollidon® 90 F melted very slowly; significantly more so than Kollidon® 25 or Kollidon® CL-M. They were slower to melt than the control;
10. Smoothness/Coarseness: Kollidon® 90F was significantly less coarse and more smooth than the other samples. No differences were found among Kollidon® 25, Kollidon® CL-M and the control; and
11. Mouthcoating: Kollidon® 90F coated the mouth more than any other sample and was like the standard ice cream attribute.

In summary, all samples provided superior results over the control for mouthfeel properties such as gumminess, thickness and melting rate. The Kollidon® 25 and Kollidon® CL-M samples performed the same as the control in adhesiveness, smoothness and smoothness/coarseness. The Kollidon® 90 produced greater effects on body and texture than the other polyvinylpyrrolidone samples.

EXAMPLE 2

Ice cream samples containing stabilizers and different concentrations of polyvinylpyrrolidone (Kollidon® 90) were prepared using the same methods used to prepare standard fatted ice cream:

|  | Negative Control | Stabilizer #19 | 1% PVP | 0.5% PVP | 0.25% PVP |
| --- | --- | --- | --- | --- | --- |
| Sugar | 12% | 12% | 12% | 12% | 12% |
| 35 DE corn syrup solids | 3% | 3% | 3% | 3% | 3% |
| 15 DE maltodextin | 3% | 3% | 3% | 3% | 3% |
| Simplesse ® | 5% | 5% | 5% | 5% | 5% |
| Dry buttermilk | 1% | 1d% | 1% | 1% |  |
| Nonfat milk solids | 13.5% | 13.5% | 13.5% | 13.5% | 13.5% |
| Fat | 0.0% | 0.0% | 0.0% | 0.0% | 0.0% |
| Stabilizer #19//Kollidone ® | 0.0% | 1.1% | 1.0% | 0.5% | 0.25% |
| Water | 62.5% | 61.4% | 61.5% | 62.0% | 62.25% |

Stabilizer #19 was obtained from Stabilized Products, Inc., Saint Louis, Mo. The samples containing the polyvinylpyrrolidone did not contain Stabilizer #19.

The above samples were compared to a commercially prepared ice cream (Prairie Farm Dairy) containing 10 to 12% fat and approximately 39% total solids.

All of the polyvinylpyrrolidone samples exhibited superior melting rate, smoothness, and gumminess over the control.

Table 1 summarizes the results obtained from a sensory panel evaluating 6 ice cream formulations.

TABLE 1

| | APPEARANCE | | | |
| --- | --- | --- | --- | --- |
| | Fluffy | | Adhesive | |
| Sample | Fresh | Stored | Fresh | Stored |
| No Stabilizer | 9.2$_b$ | 8.8 | 3.5$_c$ | 2.2$_d$ |
| Stabilizer 19 | 6.7$_{c,d}$ | 7.4 | 5.0$_{b,c}$ | 4.8$_c$ |
| 0.25% | 8.2$_{b,c}$ | 7.6 | 5.7$_{b,c}$ | 5.4$_{b,c}$ |
| 0.5% | 5.7$_d$ | 9.0 | 7.5$_{a,b}$ | 6.8$_{a,b}$ |
| 1.0% | 7.9$_{b,c}$ | 7.0 | 9.9$_a$ | 8.7$_a$ |
| Ice Cream | 11.2$_a$ | 9.6 | 7.1$_b$ | 5.3$_{b,c}$ |

$_{a,b,c,d,e}$Numbers followed by different subscripts differ (P < 0.05)

The results for fluffiness indicate that with fresh samples all samples decreased fluffy appearance compared to the unstabilized control nonfat product. However, the effects were not proportional to the concentration of polyvinylpyrrolidone. No significant effect of treatment was observed with stored sample.

For adhesiveness, Kollidon® 90F stood out as functional in increasing adhesiveness. The 0.25% sample was as effective as 1.1% of a stabilizer recommended for non-fat ice cream. The 1.0% sample produced significantly more adhesiveness that was present in the fatted ice cream control.

Tables 2–5 display the results for the mouthfeel attributes.

TABLE 2

| Sample | Gummy | | Thickness | | Melt Rate | |
|---|---|---|---|---|---|---|
| | Fresh | Stored | Fresh | Stored | Fresh | Stored |
| No Stabilizer | $3.2_a$ | $3.0_d$ | $4.1_d$ | $5.7_d$ | $3.3_d$ | 3.3d |
| Stabilizer 19 | $5.0_{d,e}$ | $5.9_c$ | $7.4_c$ | $8.7_{b,c}$ | $5.2_c$ | $6.3_{b,c}$ |
| 0.25% 90F | $6.1_{c,d}$ | $5.1_c$ | $7.0_c$ | $7.5_c$ | $6.3_{b,c}$ | $5.2_c$ |
| 0.5% 90F | $9.1_{a,b}$ | $9.5_c$ | $8.6_{b,c}$ | $9.0_{a,b,c}$ | $7.0_{a,b}$ | $6.9_{a,b}$ |
| 1.0% 90F | $9.9_a$ | $11.3_a$ | $11.2_a$ | $10.3_a$ | $8.3_a$ | $7.7_{a,b}$ |
| Ice Cream | $7.7_{b,c}$ | $7.8_b$ | $7.8_b$ | $9.7_{a,b}$ | $7.6_{a,b}$ | $8.1_a$ |

$_{a,b,c,d,e}$Numbers followed by different subscripts differ ($P < 0.05$)

The results for the gumminess measurements indicate that, as with adhesiveness, polyvinylpyrrolidone substantially increased gumminess with the 0.5% sample raising the level significantly over that of the sample with 1.1% nonfat stabilizer. The 1% sample produced more gumminess than was seen in the ice-cream control.

The results for the thickness measurements indicate that responses were parallel with those of adhesiveness and gumminess. That is, polyvinylpyrrolidone was highly functional in simulating desired textural characteristics of full fatted ice cream.

TABLE 3

| Sample | Smooth | | Coarse | |
|---|---|---|---|---|
| | Fresh | Stored | Fresh | Stored |
| No Stabilizer | $6.6_c$ | $7.0_d$ | $8.0_a$ | $7.4_a$ |
| Stabilizer 19 | $11.4_b$ | $11.8_b$ | $3.6_b$ | $4.7_b$ |
| 0.25% 90F | $10.0_b$ | $9.9_c$ | $4.7_c$ | $4.5_b$ |
| 0.5% 90F | $11.7_b$ | $10.9_{b,c}$ | $3.4_b$ | $4.0_b$ |
| 1.0% 90F | $11.2_b$ | $11.0_{b,c}$ | $3.7_b$ | $4.8_b$ |
| Ice Cream | $14.5_a$ | $14.5_a$ | $1.1_c$ | $0.9_c$ |

$_{a,b,c,d,e}$Numbers followed by different subscripts differ ($P < 0.05$)

For the smoothness/coarseness measurements, no differences were seen among non-fat ice creams stabilized with Stabilizer #19 or any of the three concentrations of polyvinylpyrrolidone. However, each of the samples were significantly smoother and less coarse than the nonstabilized nonfat ice cream. The ice cream control was significantly more smooth and less coarse than any other sample.

TABLE 4

| Sample | Mouthcoating | |
|---|---|---|
| | Fresh | Stored |
| No Stabilizer | $5.4_b$ | $5.9_c$ |
| Stabilizer 19 | $6.9_{c,d}$ | $6.9_{b,c}$ |
| 0.25% 90F | $6.0_d$ | $7.9_{a,b}$ |
| 0.5% 90F | $8.0_{b,c}$ | $8.5_{a,b}$ |
| 1.0% 90F | $8.8_{a,b}$ | $8.4_{a,b}$ |
| Ice Cream | $9.9_a$ | $9.0_a$ |

$_{a,b,c,d,e}$Numbers followed by different subscripts differ ($P < 0.05$)

The results indicate that for the mouthcoating measurements, the 0.5% or 1% samples produced mouthcoating sensations no different than those seen with the fatted ice cream control and were significantly higher than the ones found for the Stabilizer #19 sample or the unstabilized/nonfat ice cream.

TABLE 5

| Sample | Astringent | |
|---|---|---|
| | Fresh | Stored |
| No Stabilizer | $7.6_a$ | $6.6_{a,b}$ |
| Stabilizer 19 | $6.9_a$ | $7.2_a$ |
| 0.25% 90F | $7.4_a$ | $6.5_{a,b}$ |
| 0.5% 90F | $7.5_a$ | $6.8_{a,b}$ |
| 1.0% 90F | $6.1_a$ | $5.5_b$ |
| Ice Cream | $3.9_b$ | $3.7_c$ |

$_{a,b,c,d,e}$Numbers followed by different subscripts differ ($P < 0.05$)

The measurements for astringency indicate that the control ice cream (fatted) sample was decidedly less astringent than any other sample. It is believed that dry buttermilk used in the nonfat products, but not in the ice cream, was responsible for this mouthfeel characteristic.

The melting rate of the samples indicated that the effects were significant with increased polyvinylpyrrolidone concentration causing increased time to melt in the mouth.

The following attributes were also observed:
1. No stabilizer, non-fat: Coarse and crumbly;
2. Stabilizer #19, non-fat: Very coarse, very crumbly;
3. 0.25% Kollidon® 90F, non-fat: Slightly coarse;
4. 0.5% Kollidon® 90F, non-fat: Slightly coarse;
5. 1.0% Kollidon® 90F, non-fat: Slightly smooth, moderately creamy;

The samples were also put through heat shock with no adverse textural changes noted.

EXAMPLE 3

Fat-free muffins (with and without blueberries) along with controls were prepared having the following ingredients:

| Ingredient | Control | Experimental | Neg Control |
|---|---|---|---|
| Bread Flour | 28.60 | 28.60 | 28.60 |
| Granulated Sugar | 18.81 | 18.81 | 18.81 |
| Baking Powder | 2.00 | 2.00 | 2.00 |
| Salt | 0.63 | 0.63 | 0.63 |
| N-Flate (National Starch Chemical Company) | 2.50 | — | — |
| Kollidon ® 90 | — | 0.10* | — |
| Skim Milk | 20.91 | 23.31 | 23.41 |
| Liquid Egg White | 9.00 | 9.00 | 9.00 |
| High Fructose Corn Syrup | 4.00 | 4.00 | 4.00 |
| Water | 2.25 | 2.25 | 2.25 |
| Blueberries | 11.30 | 11.30 | 11.30 |

As the level of Kollidon® 90 increased, the level of skim milk was reduced. The liquid material was combined and mixed at low speed for about three minutes. The dry ingredients were slowly added to the liquid ingredients with continuous mixing at low speed for approximately one minute, until the flour was fully moistened. The blueberries were folded into the resulting composition. The composition was baked for about 17–20 minutes at 400° F.

The amount of Kollidon® 90 used in the fat-free muffins with blueberries was as follows: 0.00%, 0.10%, 0.25%, 0.50%, 0.75%, and 1.0%.

The amount of polyvinylpyrrolidone used in the fat-free muffins without blueberries was as follows: 0.00%, 0.05%, 0.10%, 0.15%, 0.25%, 0.50%, 0.75%, and 1.0%.

The samples were evaluated after baking and over six days. The polyvinylpyrrolidone samples were compared and evaluated against a positive control (fat-free system containing 2.5% N-Flate) and against a negative control (fat-free system containing 2.5% skim-milk (replaced the N-Flate)).

Physical test were conducted to evaluate: a) percent weight lost on baking; b) muffin volume; c) percent residual moisture; d) water activity; and e) texture as measured by a penetrometer. Penetration was measured by applying a needle-shaped penetrometer to the muffin. Percent compression=Height$_I$–Height$_F$/Height$_I$, which was measured by applying a flat surface at constant force to the muffin and then measuring the height of muffin after release of the force.

Tables 6 and 7 display the results of the physical testing of the fat-free muffins made without blueberries.

The results indicate that Kollidon® 90 had no appreciable effect on physical characteristics of batter with blueberries. The 1% polyvinylpyrrolidone samples show an increase batter density not seen when blueberries were absent.

TABLE 6

|  | Positive Control | Negative Control | Kollidon ® 90F (%) | | | | | | |
|---|---|---|---|---|---|---|---|---|---|
|  |  |  | 0.05 | 0.10 | 0.15 | 0.25 | 0.50 | 0.75 | 1.0 |
| Batter pH | 649 | 647 | 6.52 | 6.52 | 6.57 | 6.48 | 6.44 | 6.49 | 6.51 |
| Batter Density g/cc | 1.09 | 1.09 | 1.16 | 1.06 | 1.16 | 1.01 | 1.02 | 1.02 | 1.07 |
| Batter Flow cm @ 1 min | 3.1 | 8.3 | 8.8 | 8.0 | 7.5 | 6.0 | 5.5 | 6.5 | 6.0 |
| Batter Flow cm @ 2 min | 3.5 | 9.0 | 9.8 | 8.8 | 8.5 | 6.5 | 6.0 | 7.0 | 6.5 |

The results displayed in Table 6, indicate that little effect was seen on the physical characteristics of the batter with increasing Kollidon® 90 concentration. Changes in batter density and batter flow at higher concentrations were not significant.

TABLE 7

|  | Positive Control | Negative Control | Kollidon ® 90 | | | | | | |
|---|---|---|---|---|---|---|---|---|---|
|  |  |  | 0.05% | 0.10% | 0.15% | 0.25% | 0.50% | 0.75% | 1.0% |
| % Weight Loss on Baking | 7.5 | 9.6 | 9.2 | 9.4 | 9.1 | 8.9 | 9.4 | 8.4 | 9.1 |
| Volume cc | 91.0 | 106.2 | 102.5 | 111.2 | 99.3 | 108.4 | 110.8 | 112.8 | 111.5 |
| % Residual Moisture | 31.1 | 33.3 | 30.5 | 31.5 | 29.8 | 33.5 | 32.1 | 33.0 | 32.6 |
| Water Activity (AW) | 0.887 | 0.889 | 0.875 | 0.887 | 0.886 | 0.894 | 0.890 | 0.891 | 0.893 |
| Penetration mm# | 168 | 150 | 162 | 177 | 169 | 154 | 158 | 199 | 196 |
| Compression %* | 12 | 18 | 18 | 18 | 18 | 12 | 34 | 26 | 32 |

The results displayed in Table 7 indicate that increasing the Kollidon® 90 concentration results in significant increases in muffin volume and texture (as measured by penetration and compression). The results in Table 7 also indicate that higher compression values indicate softness (doesn't crumble) due to increased moistness. However, muffins with higher compression values tended to have sticky textures.

Tables 8–9 display the results obtained for the physical testing of the fat-free muffins with blueberries.

TABLE 8

|  |  |  | Kollidon ® 90 | | | | |
|---|---|---|---|---|---|---|---|
|  | Positive Control | Negative Control | 0.10% | 0.25% | 0.50% | 0.75% | 1.00% |
| Batter pH | 6.48 | 6.49 | 6.45 | 6.47 | 6.45 | 6.54 | 6.49 |
| Batter Density g/c | 1.06 | 1.20 | 1.16 | 1.12 | 1.06 | 1.06 | 1.26 |
| Batter Flow cm/min @ 1 min | 3.75 | 8.0 | 6.0 | 7.0 | 7.0 | 5.8 | 6.0 |
| Batter Flow cm/min @ 2 min | 4.25 | 8.8 | 6.5 | 7.5 | 7.5 | 6.5 | 6.5 |

TABLE 9

|  | Positive Control | Negative Control | Kollidon ® 90 | | | | |
|---|---|---|---|---|---|---|---|
|  |  |  | 0.10% | 0.25% | 0.50% | 0.75% | 1.00% |
| % Weight Loss on Baking | 7.0 | 9.4 | 10.1 | 9.5 | 7.8 | 7.5 | 8.1 |
| Volume (cc) | 85.2 | 98.2 | 101.0 | 97.1 | 96.8 | 99.3 | 96.1 |
| % Residual Moisture | 32.6 | 35.3 | 36.1 | 39.7 | 33.7 | 34.0 | 34.2 |
| Water Activity (AW) | 0.906 | 0.909 | 0.911 | 0.911 | 0.913 | 0.910 | 0.907 |
| Penetration (mm) | 121 | 193 | 170 | 166 | 168 | 193 | 192 |

The results displayed in Table 9 indicate that blueberries reduced the volume of all samples. The blueberries affected other characteristics of the control much more than they did the Kollidon® 90 muffins.

An external evaluation of the fat-free muffins without blueberries was made after six days and the results are displayed in Table 10.

cially trained in attribute analysis of baked goods. External and internal attributes were measured. The external attributes measured included: 1) volume, 2) symmetry and 3) crust color. The internal attributes measured included: 1) grain, 2) texture, 3) crumb, 4) color, 5) aroma and 6) eating quality.

TABLE 10

|  | Positive Control | Negative Control | Kollidon ® 90 | | | | |
|---|---|---|---|---|---|---|---|
|  |  |  | 0.10% | 0.25% | 0.50% | 0.75% | 1.00% |
| Volume (max = 15) | 12 | 14 | 15 | 14 | 14 | 14 | 14 |
| Symmetry (max = 10) | 9 | 9 | 9 | 9 | 9 | 8 | $8^3$ |
| Crust Color (max = 5) | 5 | 5 | 4 | 4 | 4 | 3 | $3^3$ |
| Crust Character (max = 5) | 2 | 2 | 3 | 3 | 2 | 2 | 1 |
| Total External (max = 35) | 28 | 30 | 31 | 30 | 29 | 27 | 26 |

The results indicate that the total external attributes of six day old muffins (without blueberries) made with 0.1% Kollidon® 90 were judged superior to those of muffins made with N-Flate. Specifically, the volume of the muffins made with Kollidon® 90 was significantly greater (>>20%) than those made with N-Flate

EXAMPLE 4

Muffins were prepared as described in Example 3 having the following concentration of Kollidon® 90F (with and without blueberries): 0.00%, 0.10%, 0.25%, 0.50%, 0.75%, and 1.0% Kollidon® 90. The samples were compared to a positive control containing a fat-free system containing 2.5% N-Flate and a negative control containing 2.5% skim-milk (replaced the N-Flate). The samples were tested for organoleptic attributes using an expert sensory panel spe- Tables 11–13 display the results for non-fat muffins without blueberries. Table 11 lists the results for internal attributes after six days.

TABLE 11

|  | Positive Control | Negative Control | Kollidon ® 90 | | | | |
|---|---|---|---|---|---|---|---|
|  |  |  | 0.10% | 0.25% | 0.50% | 0.75% | 1.00% |
| Grain (max = 15) | 10 | 10 | 9 | 9 | 7 | 7 | 7 |
| Texture (max = 10) | 3 | 2 | 3 | 3 | 4 | 3 |  |
| Crumb Color (max = 10) | 8 | 8 | 8 | 8 | 8 | 8 | 8 |
| Aroma (max = 10) | 8 | 8 | 9 | 8 | 8 | 8 |  |
| Eating Quality (max = 20) | 8 | 5 | 10 | 9 | 10 | 8 | 7 |
| Total Internal (max = 65) | 37 | 33 | 39 | 37 | 37 | 34 | 32 |

The results indicate that the total internal attributes of six day old muffins (without blueberries) made with 0.1% Kollidon® 90 superior to those of muffins made with N-Flate. Also, the eating quality was judged to be significantly better with 0.1% Kollidon® 90 after six days.

Table 12 list the attributes after six days.

TABLE 12

|  | Positive Control | Negative Control | Kollidon 200 90 | | | | |
|---|---|---|---|---|---|---|---|
|  |  |  | 0.10% | 0.25% | 0.50% | 0.75% | 1.00% |
| Total of External + Internal Scores After 6 days (max = 100) | 65 | 63 | 70 | 67 | 66 | 61 | 58 |

The results from Table 12 show that the total external and internal scores for six day old muffins (without blueberries) made with 0.1% Kollidon® 90 were significantly better than scores for muffins made with N-Flate. The particular, primary contributors to overall superior muffin attributes were the increase in volume and superior eating quality.

TABLE 13

|  | Negative Control | | | Control | | | Kollidon ® 90 | | | | | | | | | | | | | | |
|---|---|---|---|---|---|---|---|---|---|---|---|---|---|---|---|---|---|---|---|---|---|
|  | | | | | | | 0.1% | | | 0.25% | | | 0.5% | | | 0.75% | | | 1.00% | | |
| Days | 1 | 3 | 6 | 1 | 3 | 6 | 1 | 3 | 6 | 1 | 3 | 6 | 1 | 3 | 6 | 1 | 3 | 6 | 1 | 3 | 6 |
| External | 29 | 28 | 28 | 32 | 30 | 30 | 32 | 32 | 31 | 31 | 31 | 30 | 30 | 28 | 29 | 30 | 28 | 27 | 29 | 27 | 26 |
| Internal | 47 | 43 | 37 | 43 | 40 | 33 | 43 | 44 | 39 | 43 | 42 | 37 | 36 | 32 | 37 | 36 | 32 | 34 | 33 | 29 | 32 |
| Total | 76 | 71 | 65 | 75 | 70 | 63 | 75 | 76 | 70 | 74 | 73 | 67 | 67 | 63 | 66 | 66 | 60 | 62 | 62 | 56 | 58 |

Maximum Total = 100

The results from Table 13 indicate that the total attribute values for muffins (without blueberries) made with 0.1% Kollidon® 90 increased over six days of storage when compared to either the muffin made with N-Flate or the negative control.

Tables 14–16 display the results for the fat-free muffins made with blueberries. Table 14 lists the external attributes after six days.

The results displayed in Table 14 indicate that the total external attributes of six day old muffins made with blueberries and 0.1% Kollidon® 90 were superior to those muffins made with N-Flate. Also, the volume of the muffins made with Kollidon® 90 were significantly greater (>>25%) than those made with N-Flate. Increasing Kollidon® 90 resulted in a stickier product than controls (crust character).

Table 15 lists the results of internal muffin attributes after six days.

TABLE 14

|  |  |  | Kollidon ® 90 | | | | |
|---|---|---|---|---|---|---|---|
|  | Positive Control | Negative Control | 0.10% | 0.25% | 0.50% | 0.75% | 1.00% |
| Volume (max = 15) | 11 | 13 | 14 | 13 | 13 | 14 | 13 |
| Symmetry (max = 10) | 9 | 9 | 9 | 9 | 8 | 8 | 9 |
| Crust Color (max = 5) | 4 | 4 | 3 | 4 | 4 | 3 | 4 |
| Crust Character (max = 5) | 2 | 1 | 2 | 1 | 0 | 0 | 0 |
| Total External (max = 35) | 26 | 27 | 28 | 27 | 25 | 25 | 26 |

TABLE 15

|  |  |  | Kollidon ® 90 | | | | |
|---|---|---|---|---|---|---|---|
|  | Positive Control | Negative Control | 0.10% | 0.25% | 0.50% | 0.75% | 1.00% |
| Grain (max = 15) | 10 | 10 | 11 | 11 | 9 | 9 | 10 |
| Texture (max = 10) | 4 | 4 | 6 | 4 | 3 | 2 | 2 |
| Crumb Color (max = 10) | 8 | 8 | 8 | 8 | 8 | 8 | 8 |
| Aroma (max = 10) | 9 | 9 | 9 | 9 | 9 | 9 | 9 |
| Eating Quality (max = 20) | 10 | 8 | 12 | 9 | 6 | 3 | 1 |
| Total Internal (max = 65) | 41 | 39 | 46 | 41 | 35 | 31 | 30 |

The results listed in Table 15 indicate that the total internal attributes of six day old muffins made with blueberries and 0.1% Kollidon® 90 were superior to those of muffins made with N-Flate. The eating quality was significantly greater with 0.1% Kollidon® 90 after six days.

Table 16 displays the results of the total muffin attributes after six days

TABLE 16

|  | Positive Control | Negative Control | Kollidon ® 90 | | | | |
|---|---|---|---|---|---|---|---|
|  |  |  | 0.10% | 0.25% | 0.50% | 0.75% | 1.00% |
| Total of External + Internal Scores After 6 Days (max = 100) | 67 | 66 | 74 | 68 | 60 | 56 | 56 |

The results indicate that the external and internal scores for six day old muffins made with blueberries and 0.1% Kollidon® 90 were significantly better than scores for muffins made with N-Flate. The primary attribute contributors were the increase in volume and superior eating quality.

Table 17 lists the summary of the six day study of the fat-free muffins with blueberries.

TABLE 17

|  | Control | | | Negative Control | | | Kollidon ® 90 | | | | | | | | | | | | | | |
|---|---|---|---|---|---|---|---|---|---|---|---|---|---|---|---|---|---|---|---|---|---|
|  |  |  |  |  |  |  | 0.1% | | | 0.25% | | | 0.5% | | | 0.75% | | | 1.00% | | |
| Days | 1 | 3 | 6 | 1 | 3 | 6 | 1 | 3 | 6 | 1 | 3 | 6 | 1 | 3 | 6 | 1 | 3 | 6 | 1 | 3 | 6 |
| External | 29 | 28 | 26 | 31 | 30 | 27 | 30 | 29 | 28 | 29 | 28 | 27 | 28 | 27 | 25 | 28 | 26 | 25 | 28 | 27 | 26 |
| Internal | 47 | 44 | 41 | 48 | 44 | 39 | 49 | 48 | 46 | 46 | 43 | 41 | 44 | 39 | 35 | 42 | 34 | 31 | 38 | 32 | 30 |
| Total | 76 | 72 | 67 | 79 | 74 | 66 | 79 | 77 | 74 | 75 | 71 | 68 | 72 | 66 | 60 | 70 | 60 | 56 | 69 | 59 | 56 |

Maximum Total = 100

The results from Table 17 indicate that the total attribute values for muffins made with blueberries and 0.1% Kollidon® 90 increase over six days of storage when compared to either the muffin made with N-Flate or the negative control.

The addition of 0.10% Kollidon® 90 resulted in overall higher attribute scores for muffins made with or without blueberries when compared to muffins made with N-Flate and the negative controls, at 3 and 6 Days. The volume of the all muffins containing 0.10% Kollidon® 90 was significantly greater than the volume of the muffins made with N-Flate. The eating quality of all muffins containing 0.10% Kollidon® 90 was similar to the controls at day 1, but was significantly better at 3 and 6 days evaluation. The texture of the muffins containing blueberries and 0.10% Kollidon® 90 was similar to the controls at day 1, but were judged better at 3 and 6 days evaluation.

The superior texture and eating quality observed over time is attributed to the increased moistness (less staling) of the muffins containing 0.10% Kollidon® 90. At polyvinylpyrrolidone levels above 0.25%, the increased moisture was judged inferior to controls at time zero due to a less acceptable (more "rubbery") texture. The "grain" of the muffins containing Kollidon® 90 was judged to be different—more "breadlike"—than the grain of the controls. Increasing the percentage of Kollidon® 90 above 0.10% either typically did not improve the muffin's attributes, or negatively affected the attributes.

The addition of 0.10% Kollidon® 90 resulted in overall higher attribute scores for muffins made with or without blueberries when compared to controls at 3 and 6 days evaluation. The superior texture and eating quality observed over time is attributed to the increased moistness (less staling) of the muffins containing 0.10% Kollidon® 90.

Finally, initial screening of the muffin systems suggested that Kollidon® 90 was not effective in a low-fat system (only effective in a fat-free system).

EXAMPLE 5

Low fat pourable salad dressing compositions were prepared containing polyvinylpyrrolidone at: 0.0%, 0.25%, 0.50%, 0.75%, and 1.0% according to the following ingredient list:

| Ingredient | Control (%) | Experimental (%) |
|---|---|---|
| Water | 46.93 | 46.68 |
| Vinegar | 31.50 | 31.50 |
| Sugar | 13.10 | 13.10 |
| Salt | 4.00 | 4.00 |
| Keltrol ® T, xanthan gum (Merck & Co., Inc.) | 0.32 | 0.32 |
| Avicel ® CL 611 | 1.25 | 1.25 |
| Beta Carotene Soln (1.2%) | 0.50 | 0.50 |
| Kollidon ® 90 | — | (example) 0.25 |
| Minced Onion | 0.40 | 0.40 |
| Oregano | 0.15 | 0.15 |
| Red Bell Pepper Pieces | 0.15 | 0.15 |
| Vegetable Oil | 1.50 | 1.50 |
| Potassium Sorbate | 0.10 | 0.10 |
| Sodium Benzoate | 0.10 | 0.10 |

Sugar, xanthan gum, Avicel®, and Kollidon® 90 were dry blended and added to water, while agitating. The blend was mixed continuously on high speed for about 10 minutes. Oil was then added and mixed into the mix for one minute. Beta carotene, vinegar and salt were added and mixed for one minute. The spices were added last.

EXAMPLE 6

Fat-free pourable salad dressing compositions were made containing the following amounts of polyvinylpyrrolidone:

00%, 0.25%, 0.50%, 0.75%, 1.0%, 1.25%, and 1.5% and with the following ingredients:

| Ingredient | Control (%) | Experimental (%) |
|---|---|---|
| Water | 48.43 | 48.18 |
| Vinegar | 31.50 | 31.50 |
| Sugar | 13.10 | 13.10 |
| Salt | 4.00 | 4.00 |
| Keltrol ® T | 0.32 | 0.32 |
| Avicel ® CL 611 | 1.25 | 1.25 |
| Beta Carotene Soln. (1.2%) | 0.50 | 0.50 |
| Kollidon ® 90 | — | (example) 0.25 |
| Minced Onion | 0.40 | 0.40 |
| Oregano | 0.15 | 0.15 |
| Red Bell Pepper Pieces | 0.10 | 0.10 |
| Potassium Sorbate | 0.10 | 0.10 |
| Sodium Benzoate | 0.10 | 0.10 |

The sugar, xanthan gum, Avicel®, and Kollidon® 90 were dry blended and added to water, while agitating. The mixture was continuously mixed on high speed for 10 minutes. Beta carotene, vinegar and salt were added to the blend and mixed for one minute. The spices were added last.

The following examples test the attributes of low-fat pourable salad dressing evaluated as a function of Kollidon® 90 concentration. These examples are compared to a positive control comprising low-fat and fat-free salad dressing systems comprising Avicel® and xanthan gum (no Kollidon® 90 added). The attributes of fat-free pourable salad dressing were evaluated as a function of Kollidon® 90 concentration and were added to the control. All attributes were evaluated one day after preparation.

EXAMPLE 7

The pourable salad dressings were tested for sensory evaluation tests conducted to evaluate the samples for the following attributes: 1) sweet, 2) sour, 3) salt, 4) bitter, 5) spice, 6) mouthfeel, and 7) lubricity. Table 18 displays the results of the samples containing oil. Table 19 displays the results for the samples without oil.

TABLE 18

| | Kollidon ® 90 | | | | |
|---|---|---|---|---|---|
| attribute | 0.00% | 0.25% | 0.50% | 0.75% | 1.00% |
| Sweet | 3.2 | 3.5 | 3.9 | 4.3 | 4.6 |
| Sour | 6.9 | 6.4 | 5.7 | 5.2 | 4.5 |
| Salt | 4.8 | 3.6 | 3.8 | 3.6 | 3.5 |
| Bitter | 0.0 | 0.2 | 0.1 | 0.2 | 0.1 |
| Spice | 4.3 | 3.9 | 3.7 | 3.4 | 3.6 |
| Mouthfeel | 0.3 | 1.4 | 2.0 | 2.5 | 2.8 |
| Lubricity | 0.6 | 0.5 | 1.1 | 1.8 | 2.1 |

*All attributes rated on a 0 to 8 scale; 0 = none; 8 = extensive

The results displayed in Table 18 show that by increasing the concentration of Kollidon® 90 to low-fat dressings it better balanced the flavor (sweet, sour, salt). Also, there was improved mouthfeel and lubricity with increased Kollidon® 90 concentration.

For salad dressings, "mouthfeel" describes the viscosity, density, dispersion of solids, and other general characteristics perceived by consumers when the products are introduced to the mouth.

Salad dressing lubricity is related to the perception of "fattyness." For example, higher levels of lubricity suggest a greater level of perception of the presence of oil.

TABLE 19

| attribute | 0.00% | 0.25% | 0.50% | 0.75% | 1.00% | 1.25% | 1.50% |
|---|---|---|---|---|---|---|---|
| Sweet | 2.1 | 2.2 | 2.2 | 2.5 | 2.8 | 3.3 | 3.1 |
| Sour | 7.2 | 6.9 | 7.1 | 6.8 | 6.3 | 5.1 | 5.3 |
| Salt | 4.5 | 4.6 | 4.5 | 4.2 | 4.8 | 4.4 | 4.3 |
| Bitter | 0.1 | 0.0 | 0.1 | 0.2 | 0.2 | 0.3 | 0.0 |
| Spice | 4.7 | 4.4 | 4.3 | 4.4 | 4.6 | 4.3 | 4.4 |
| Mouthfeel | 0.3 | 0.1 | 0.4 | 0.3 | 0.6 | 1.1 | 0.9 |
| Lubricity | 0.1 | 0.2 | 0.0 | 0.2 | 0.0 | 0.2 | 0.0 |

*All attributes rated on a 0 to 8 scale; 0 = none; 8 = extensive

The results listed in Table 19 show that by increasing the concentration of Kollidon® 90 to fat-free dressings it better balanced the flavor (sweet, sour, salt). There also, was improved mouthfeel with increasing Kollidon® 90 concentration.

The results of the tests also showed that the addition of Kollidon® 90 to a low-fat pourable salad dressing containing Avicel® and xanthan gum substantially improved the "mouthfeel". This attribute continued to improve from 0.25% to 1.0% in a low-fat system. The benefits of the increased concentration must be balanced against textural changes that occur with increasing concentration: That is, "stringier" texture, increased separation, and slight increase in opacity was observed.

The addition of Kollidon® 90 to a fat-free pourable salad dressing that contained Avicel® and xanthan gum modestly improved the "mouthfeel". Improved attributes were observed with 1.0% Kollidon® 90 and were maximized at 1.25%. Textural changes occurred with increased concentration: That is "stringier" texture, increased separation, slight increase in opacity, and decreased viscosity of fat-free system over time was observed. (See Example 8 below).

The fat-free samples provided the best results with improved flavor release.

EXAMPLE 8

The viscosity of the low-fat and non-fat samples were studied as a function of time (up to three weeks). See FIGS.

1 and 2. For the fat-free systems the results indicated that increasing Kollidon® 90 concentration resulted in decreased viscosity of the free system after three weeks of storage.

Visual observations were conducted with the following conclusion: Increased Kollidon® 90 concentration resulted in increased separation. System separation began at 0.25% polyvinylpyrrolidone and was noticeable at 0.5%. Dressing systems that contained oil, however, separated less than fat-free systems. However, dressing systems became homogenous after shaking so that the separation may not be a problem.

In total the results indicated that the addition of 1.0% Kollidon® 90 to both low-fat and fat-free pourable salad dressing containing Avicel® microcrystalline cellulose and xanthan gum improves mouthfeel, flavor release and balance.

The invention has been described with reference to various specific embodiments. However, many variations and modifications may be made while remaining within the scope and spirit of the invention.

We claim:

1. A dairy food composition wherein said dairy food composition is provided in the substantial absence of fat and comprises at least one fat replacement consisting of polyvinvlpyrrolidone, said dairy food composition having a texture and mouthfeel of a fatted dairy food composition.

2. The composition as recited in claim 1 wherein the dairy food composition is selected from the group consisting of ice cream, yogurt, cheese, and milk.

3. The composition as recited in claim 2 wherein the dairy food composition is ice cream.

4. The composition as recited in claim 3 wherein the polyvinylpyrrolidone is provided in an amount of about 0.2 wt. % up to less than about 1.6 wt. %, based on total weight of the composition.

5. The composition as recited in claim 4 wherein the polyvinylpyrrolidone is provided in an amount from about 0.25 wt. % to about 1.0 wt. %.

6. The composition as recited in claim 5 wherein the polyvinylpyrrolidone is provided in an amount of about 1.0 wt. %.

7. The composition as recited in claim 3 wherein the food composition is a fat-free food composition.

8. The composition as recited in claim 2 wherein the food composition is a fat-free food composition.

9. The composition as recited in claim 1 wherein the food composition is a fat-free food composition.

10. The composition as recited in claim 1 wherein the food composition is a low-fat food composition.

11. The composition as recited in claim 1 wherein the food composition is a low-fat food composition.

12. The composition as recited in claim 1 wherein the food composition is a low-fat food composition.

13. A method of preparing a dairy food composition having a texture and mouthfeel of a fatted dairy food composition wherein said method comprises adding a polyvinylpyrrolidone to a dairy food composition in an amount effective to improve at least one organoleptic attribute wherein said food composition is provided in the substantial absence of fat.

14. The method as recited in claim 13 wherein the dairy food composition is selected from the group consisting of ice cream, yogurt, cheese, and milk.

15. The method as recited in claim 14 wherein the food composition is a fat-free food composition.

16. The method as recited in claim 14 wherein the food composition is a low-fat food composition.

17. The method as recited in claim 13 wherein the dairy food composition is ice cream.

18. The method as recited in claim 17 wherein the food composition is a fat-free food composition.

19. The method as recited in claim 17 wherein the food composition is a low-fat food composition.

20. The method as recited in claim 13 wherein the food composition is a fat-free food composition.

21. The mood as recited in claim 13 wherin the food composition is a low-fat food composition.

* * * * *